Figure 12:
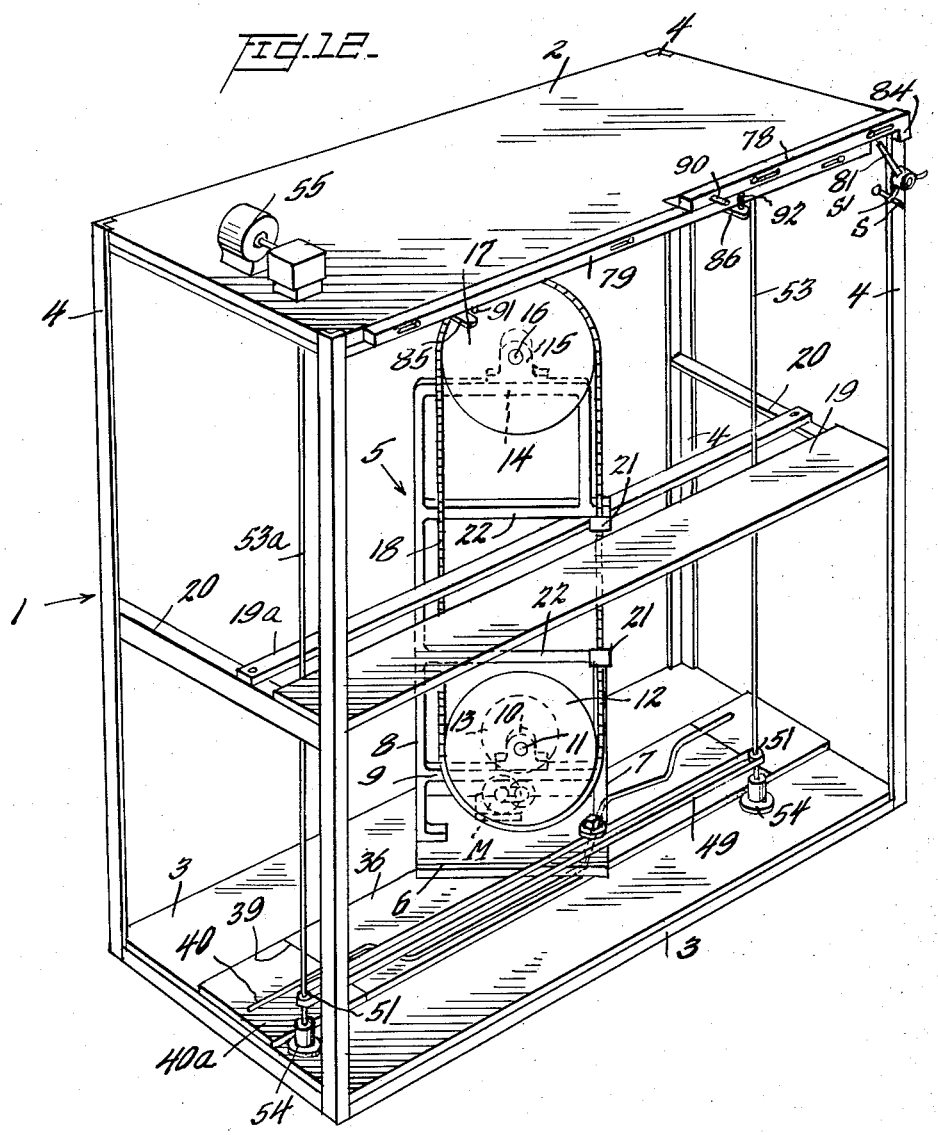

June 7, 1966  H. S. HAWKINS  3,254,684
TRAVELING BAND SAW
Filed June 3, 1963  7 Sheets-Sheet 1
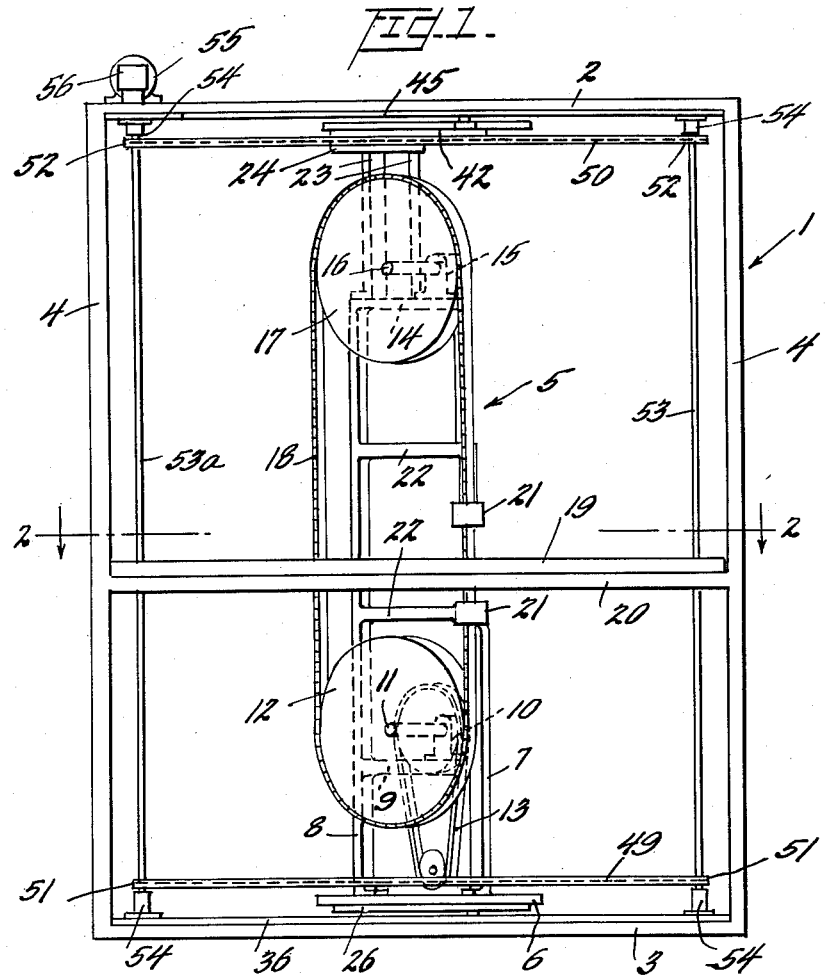
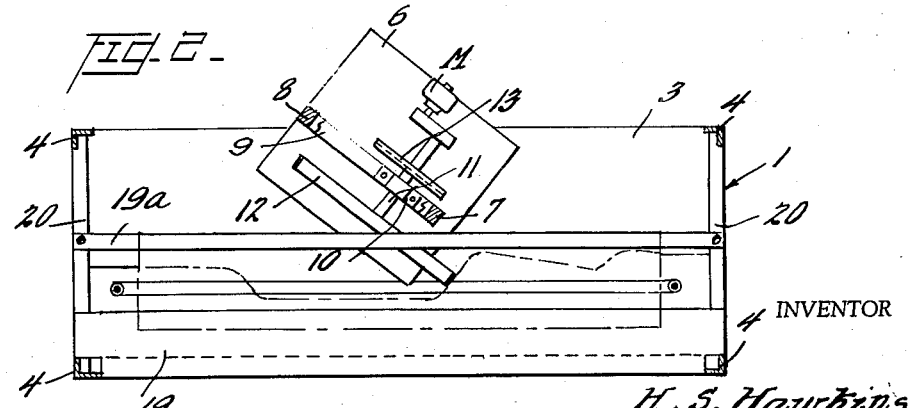
INVENTOR
H. S. Hawkins,
BY
ATTORNEYS

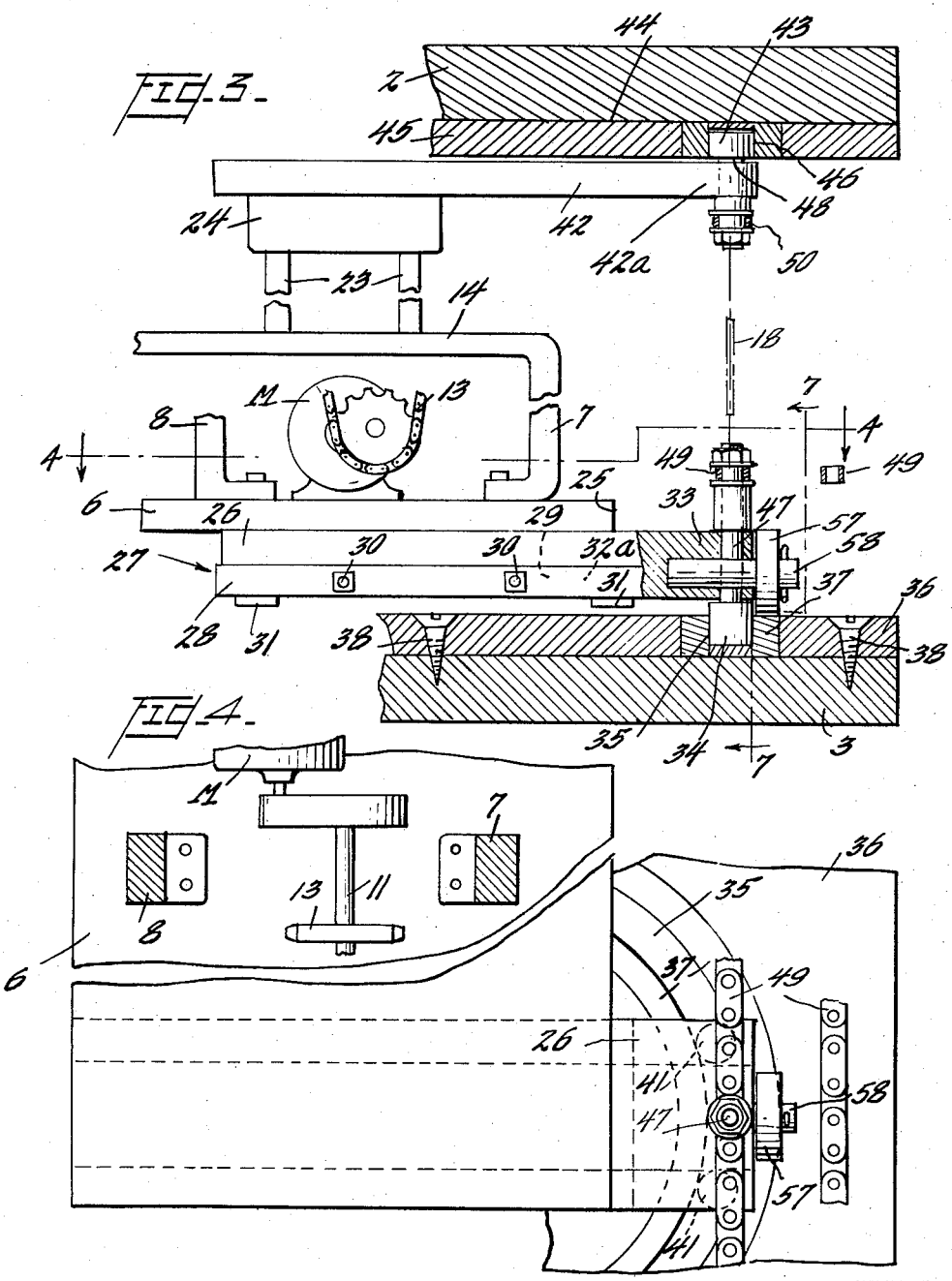

June 7, 1966 H. S. HAWKINS 3,254,684
TRAVELING BAND SAW
Filed June 3, 1963 7 Sheets-Sheet 3
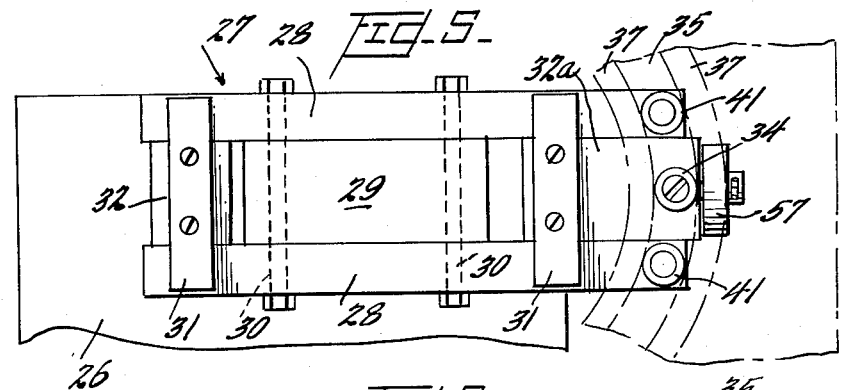
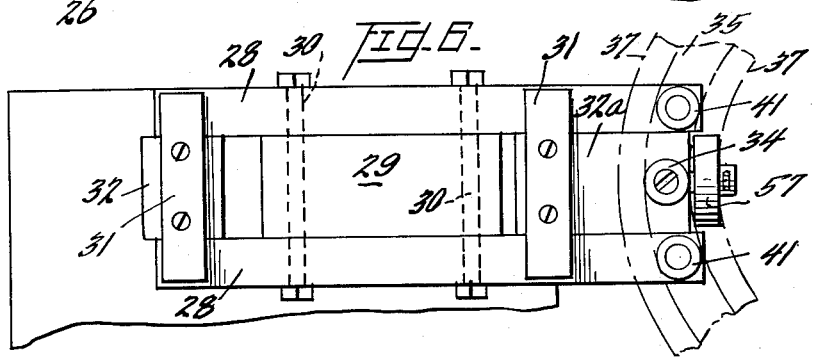
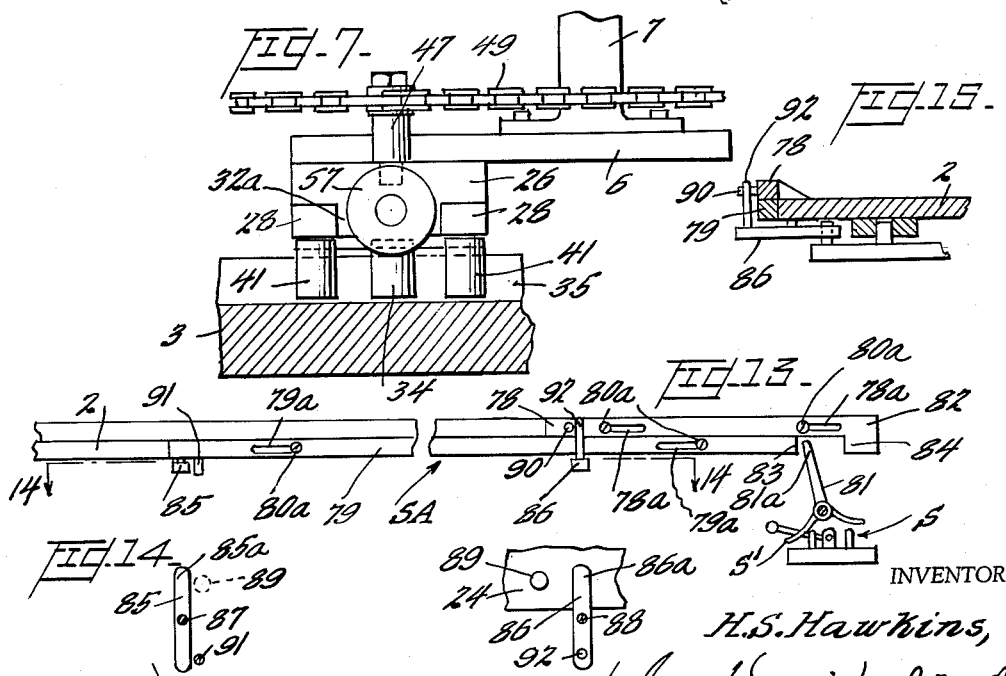
INVENTOR
H. S. Hawkins,
BY
ATTORNEYS June 7, 1966 H. S. HAWKINS 3,254,684
TRAVELING BAND SAW
Filed June 3, 1963 7 Sheets-Sheet 4
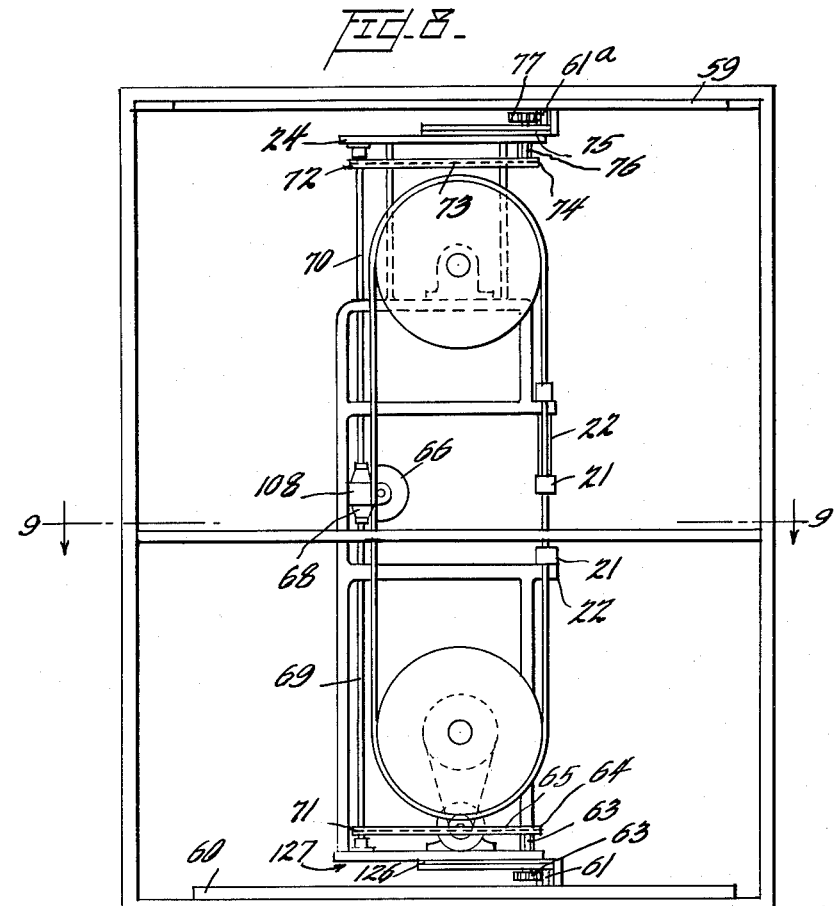
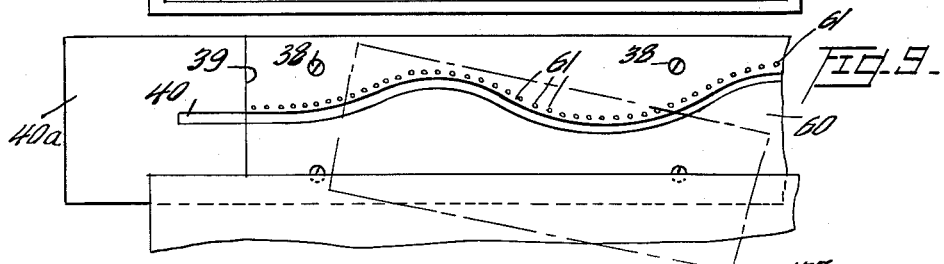
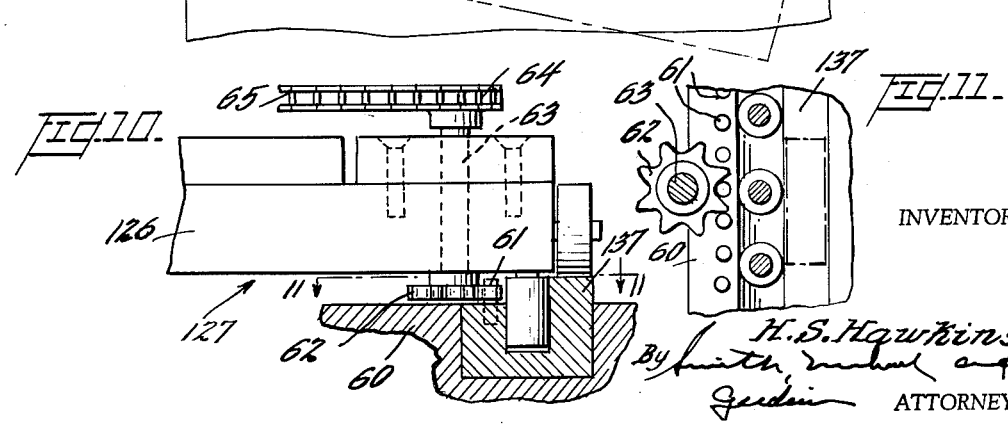
INVENTOR
H. S. Hawkins
By Smith, [illegible] and Gordon
ATTORNEYS June 7, 1966 H. S. HAWKINS 3,254,684
TRAVELING BAND SAW Filed June 3, 1963 7 Sheets-Sheet 5

INVENTOR
H. S. Hawkins,
BY
ATTORNEYS

June 7, 1966  H. S. HAWKINS  3,254,684
TRAVELING BAND SAW
Filed June 3, 1963  7 Sheets-Sheet 6
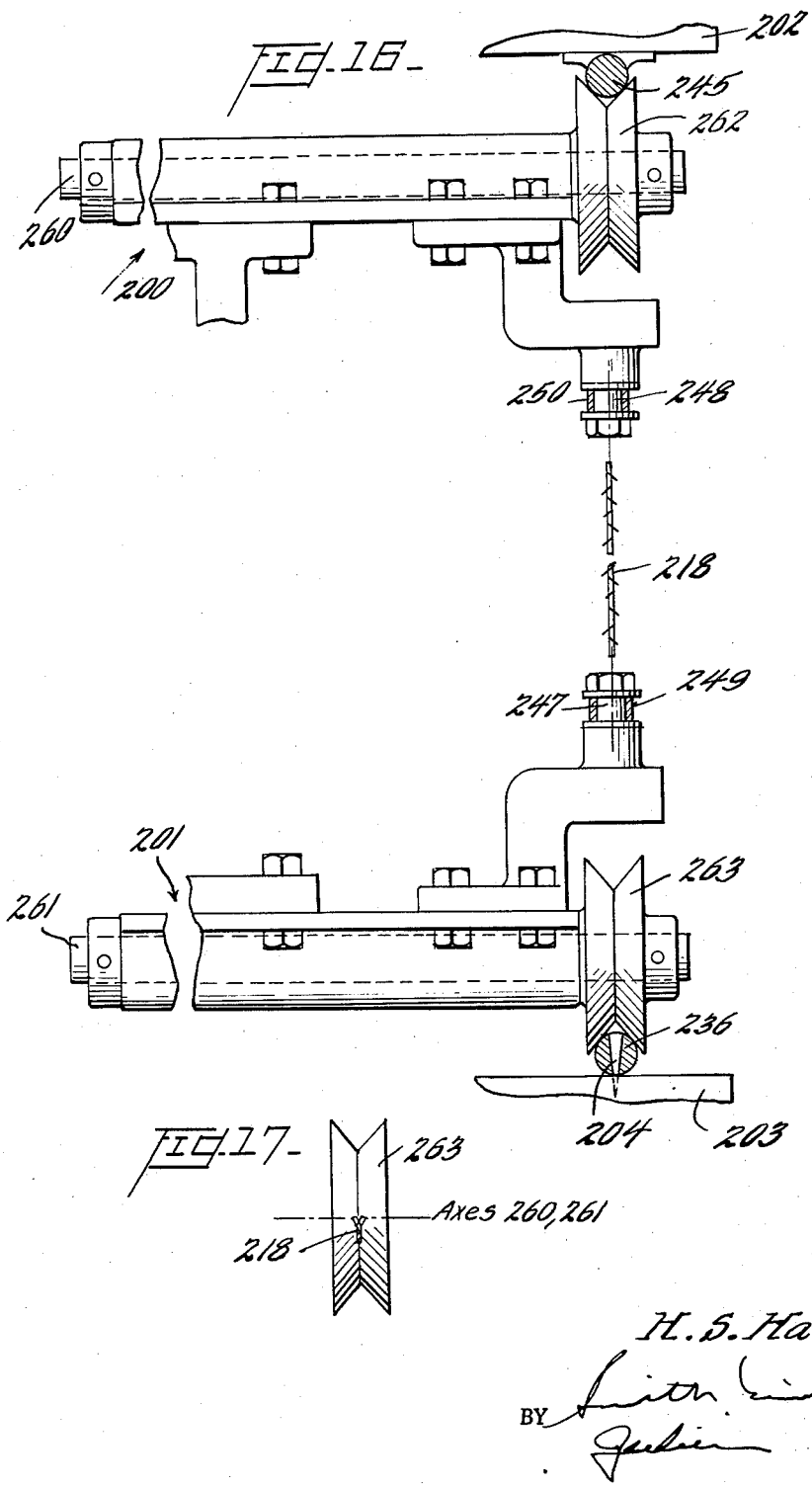
INVENTOR
H.S. Hawkins,
BY
ATTORNEYS June 7, 1966  H. S. HAWKINS  3,254,684
TRAVELING BAND SAW
Filed June 3, 1963  7 Sheets-Sheet 7
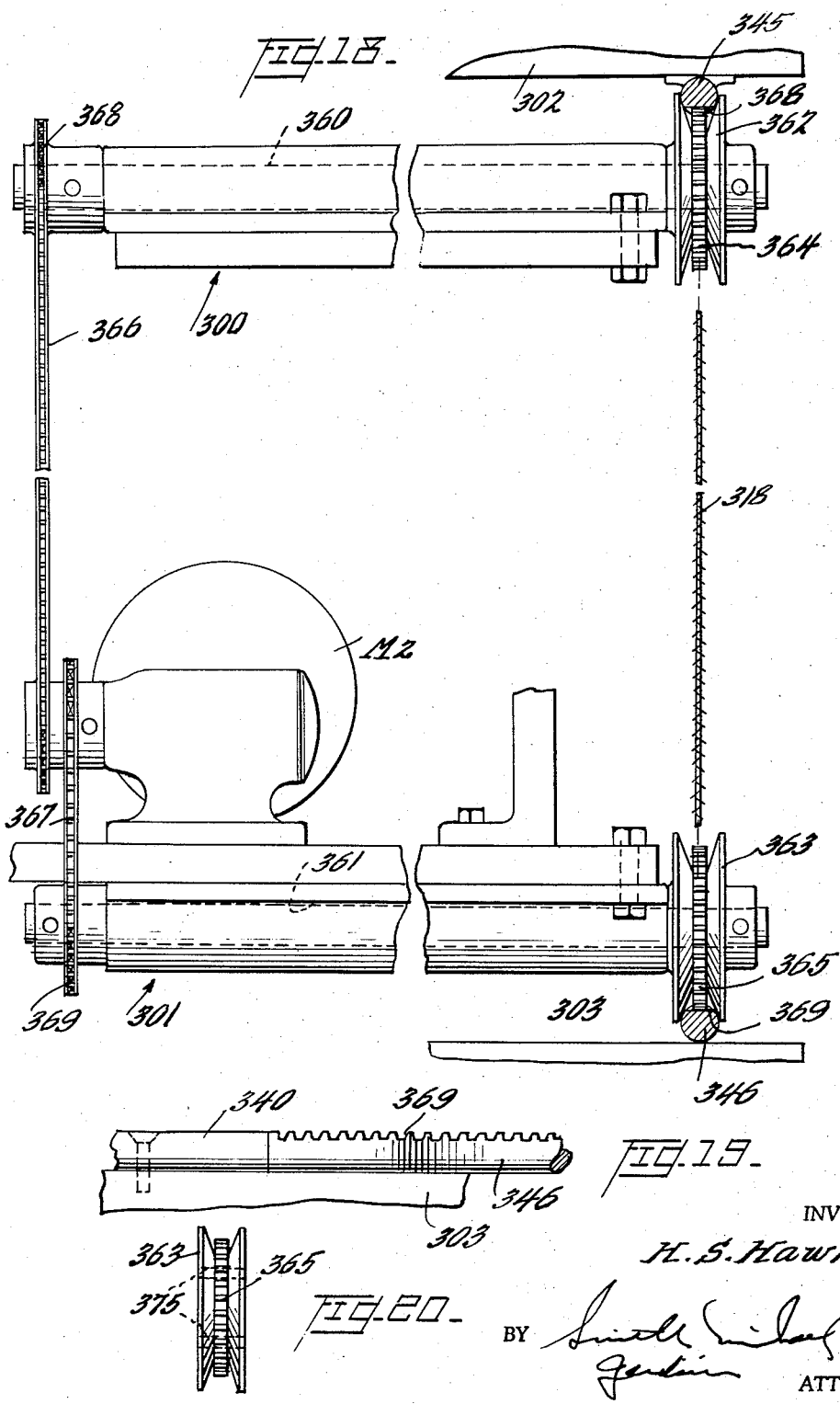
INVENTOR
H. S. Hawkins,
BY
ATTORNEY United States Patent Office 3,254,684
Patented June 7, 1966

3,254,684
TRAVELING BAND SAW
Havilah S. Hawkins, Sedgwick, Maine
Filed June 3, 1963, Ser. No. 284,948
15 Claims. (Cl. 143—17)

This invention is a band saw machine characterized by mechanisms included therein by which the band saw is moved bodily into a stationary work piece in contradistinction to the conventional practice of feeding the work to the saw.

In band sawing operations, it has been found to be awkward and cumbersome to manipulate a large sheet of work (such as plywood in 4' x 8' sheets for instance) into operative relation to a band saw blade and this is particularly true in respect to work operations requiring the sheet to be cut along undulating or curved lines.

With these facts in mind the present invention provides means whereby a work piece, such as a sheet of plywood, or the like, may be clamped to a worktable or support, in operative relation to a band saw which is made automatically to travel along a predetermined path to produce in the work piece a sawed or cut edge of predetermined contour.

Another object of the invention is to provide in a band saw machine of this character, power means for moving the driven saw through a work piece along a path corresponding to a pattern of predetermined contour.

Another object is to provide interchangeable pattern members which control the path of translational movement of the driven saw.

The invention contemplates novel means for moving the saw translationally in respect to the stationary work. One such means may include a power driven sprocket chain connected to a saw machine frame which is mounted for translation within a mounting frame. In a modified form of the invention, cooperative means are mounted on the pattern piece and on the frame of the saw machine to cause relative movement between the saw and the work.

These and other objects will become apparent from the following specification, when read in the light of the accompanying drawings wherein preferred embodiments of the invention have been illustrated and wherein FIGURE 1 is a front elevation of the invention, FIGURE 2 is a traverse sectional view taken on the line 2—2 of FIGURE 1, FIGURE 3 is a vertical fragmental sectional view showing the manner of mounting the saw frame for translational movements, FIGURE 4 is a traverse sectional view on line 4—4 of FIGURE 3, FIGURE 5 is a fragmental detail view showing one position of the guide rollers, FIGURE 6 is a view similar to that of FIGURE 5 showing the guide rollers in another position, FIGURE 7 is a fragmental detail of the drive chain connection with the saw frame, FIGURE 8 is a front elevation of a modified form of the invention, FIGURE 9 is a fragmental view looking down on the lower pattern member employed in the modified form of the invention, FIGURE 10 is a fragmental detail view of the saw frame driving means of FIGURE 8, FIGURE 11 is a fragmental detail view, partly in section showing the relation between the driving sprocket and the sprocket teeth on the pattern member as employed in FIGURE 8, FIGURE 12 is a perspective view of the invention, FIGURES 13, 14 and 15 are fragmental detail views showing the switch actuator, FIGURE 16 shows a modified form of pattern mechanism and saw frame guide means, FIGURE 17 is a detail view showing the arrangement of the saw blade with respect to the axes of the guide rollers, and FIGURES 18, 19 and 20 show a further modification of drive means for the saw carriage.

Referring more particularly to the drawings, the sawing machine of the present invention comprises a boxlike framework indicated generally by the reference character 1. The framework 1 includes upper and lower end panels 2 and 3 respectively, which are supported by and maintained in spaced relation by corner post 4. The corner posts 4 are shown as angle iron members but corner posts of any suitable design may be employed.

The band saw unit is indicated generally by the reference character 5, and includes a base plate 6 to which are secured a pair of upright arms or standards 7 and 8. A suitable distance above the base plate 6, the standards 7 and 8 are joined by a cross bar 9 which supports a journal or bearing 10 for a pulley shaft 11. A band saw pulley 12 is secured to the forward end of shaft 11. The opposite end of shaft 11 is drivingly connected to a motor M by any suitable form of gearing, belt or sprocket chain 13, the motor M being supported on the base plate 6.

The standard 8 is continued upwardly to the upper region of the framework 1, and carries a transverse bearing supporting arm 14, on which a bearing 15, for the upper saw pulley shaft 16 is disposed. The upper pulley 17 is an idle pulley, and has no driving connection other than the band saw 18, which rides on pulleys 12 and 17 in a conventional manner. Intermediate the upper pulley 17 and the lower pulley 12, the band saw blade 18 passes through a work supporting zone in which a worktable 19 is supported by cross frame members 20. As shown in FIG. 2, the work supporting table 19 extends inwardly of the framework 1 only a relatively short distance, and terminates forwardly of the area in which the saw operates. Thus, in operation, the work is secured in any convenient manner, as by clamps not shown, to the table 19, in a manner to project inwardly beyond the inner confines of the worktable, in more or less cantilever fashion, as indicated in FIG. 9.

Saw blade guide members 21 are disposed above and below the plane of the table 19 and function to maintain the saw blade 18 in a given vertical path of movement. The saw blade guide members 21 are secured to suitable extension members 22 carried by the standards 7 and 8 as shown in FIGS. 1, 8 and 12. The details of construction of saw blade guide members 21 form no part of the present invention and are fully described in my Pat. No. 2,765,008 of October 2, 1956, or in my copending application S.N. 208,162 filed June 1, 1962. Suffice it to say they provide laterally disposed adjustable members to engage the opposite side faces of the saw blade to preclude lateral deflection of the blade when in operation as well as means to engage the back edge of the blade to preclude rearward deformations of the blade due to pressure of the blade against the work, when in operation.

Extension members 23 project upwardly from the upper cross member 14 and are connected to and supported at the upper ends thereof by a plate 24. The plate 24 and the base plate 6 are each provided with means for mounting the saw and its frame within the framework 1 for translational movement and such means will now be described.

As best shown in FIG. 3, the forward edge 25 of the base plate 6 terminates inwardly (that is to the left as viewed in FIG. 3) of the path of operation of the saw blade 18. This positions the upright standard 7 so as to preclude interference with the means for translationally moving the saw frame, as will presently appear.

A carriage plate 26 is secured to the under side of base plate 6 in any convenient manner and the carriage plate 26 projects forwardly beyond the end 25 of plate 6, as shown (see FIG. 3). Mounted on the under side of the carriage plate 26, is a slidable carriage indicated generally by the reference character 27 and is similar in all respects to that shown in my copending application S.N. 183,829 filed March 10, 1962. Thus the carriage 27 (see FIGS. 5 and 6) comprises spaced bars 28 secured to opposite side faces of a spacing block 29 by bolts 30. Means for retaining the carriage 27 in operative sliding relation with the under side of plate 26 is provided in the form of retaining strips 31, secured in spaced relation to the under side of plate 26 by blocks 32–32a. The blocks 29 and 32–32a are dimensioned to provide for the necessary degree of sliding movement of the carriage 27, as will presently appear.

The block 32a may be separate from or integral with the carriage plate 26 and at its forward end 33 carries a depending guide roller 34, the axis of which coincides substantially with the path of movement of the cutting edge of the saw blade 18. The roller 34 is received within a groove 35 in a pattern member 36. The walls of the groove 35 may be reinforced by wear resistant material such as metal or plastic 37 (see FIG. 3). The pattern member 36 may be interchangeable so that saw cuts of different predetermined contour may be made when desired and to this end the pattern pieces 36 may be interchangeably mounted on the bottom panel member 3, by bolt or screw member 38. The pattern groove 35 in the respective pattern piece 36, opens out through the opposite ends 39 of the pattern piece and these ends of the groove connect with and form a continuation of straight terminal groove portions 40, provided in the upper surface of a plate 40a secured to upper face of the bottom panel member 3. This permits the saw and frame to be "parked" as it were at one end or the other of the framework 1, to permit ready change of pattern pieces 36 as will presently appear.

Cooperating with the stationary guide roller 34 in a manner to be hereinafter explained, are movable guide rollers 41, one each of which is mounted in depending relation on the forward end of each of the side bars 28 of the carriage 27, as best shown in FIGS. 5, 6 and 7.

At the upper end of the saw frame 5 the plate 24 carries a laterally projecting arm 42, which at the outer free end 42a thereof carries an upwardly projecting guide roller 43, the axis of which is aligned with the axis of lower guide roller 34. The inner face 44 of the upper panel member 2 carries a pattern member 45 which is provided with a groove 46 which is a mirror duplicate of groove 35 in the pattern piece 36 on the upper face of bottom panel member 3. Thus it is apparent that the entire saw frame 5 is supported from the top and bottom panel members 2 and 3 by the guide rollers 43 and 34 respectively, and that these rollers being aligned axially will permit the saw frame 5 to swing horizontally about the common axis of these rollers. Thus the cutting edge of the saw 18 may be presented to a work piece supported on the worktable 19 at various angles so as to cut a kerf of predetermined contour, as will presently appear.

It will be understood from an inspection of FIGS 3 through 7 that the three guide rollers 34, 41 and 43, carried by the carriage plate 26 and by the carriage 27, respectively, are engaged within the pattern groove 35 of the lower pattern piece 36 and that the movability of the roller 34 with respect to the rollers 41 and 43 permits these rollers to accommodate themselves to the curvature or changing contours of the pattern groove (see FIGS. 5 and 6) with the camming action of said rollers on the vertical walls of the pattern groove resulting in swinging movement of the saw frame 5 about the common axis of rollers 34 and 43.

With this in mind, means are provided to translate the saw and its frame along the pattern pieces 36 and 45 while the guide rollers 34, 41 and 43 travel the contoured grooves thereof. Thus pins 47 and 48 on which the stationary guide rollers 34, and 43 are mounted are extended axially in opposite directions towards one another and to these extensions, the opposite ends of a pair of sprocket chains 49 and 50 are connected. The chains 49 and 50, as shown, extend generally horizontally at the bottom and top respectively of the framework 1, and are trained about sprocket gears 51—51 and 52—52, which gears are mounted on shafts 53–53a, journalled in suitable bearings 54, carried by panels 2 and 3. A motor 55 mounted on top panel 2 of the framework 1, drives said sprocket and chain members through a gear reduction box 56 connected in any convenient manner to the shaft 53a. Thus, assuming the saw motor M for driving the saw 18 to be energized, when the motor 55 is energized, the saw unit will move bodily within the frame 1 along the pattern member, with the rollers 34, 41 and 43 traversing the pattern grooves 35 and 46 respectively. This movement, as explained, causes the band saw unit to swing about the common axis of the rollers 34 and 43 to present the blade 18 to the work at a changing angle determined by the contours of the pattern grooves traversed by the rollers and thus reproduce in the work supported on the worktable the contours of said pattern.

Means are provided to relieve the guide rollers 34 and 43 of undue strain while the saw is in operation and to this end a supporting traction roller 57 is provided on the carriage plate 26 and positioned to bear upon the pattern piece 36. The roller 57 is mounted to rotate upon a horizontal supporting shaft 58 carried by the forward end 33 of the plate 26 as shown. If desired, the pin or shaft 47 carrying the guide roller 34 may pass through an appropriate aperture provided in the shaft 58 as shown in FIG. 3. If desired, the supporting roller 57 may be disposed to ride upon the upper edge of the groove reinforcing material 37, as shown.

In a modified form of my invention, as shown in FIGS. 8, 10 and 11, a slightly different form of drive means is shown for imparting translational movement to the saw and its frame. Thus, in lieu of the sprocket chains 49 and 50 of the modification shown in FIGS. 1 through 7, the top and bottom pattern pieces 59 and 60 may be provided with upstanding sprocket teeth 61, arranged in a series along a root line spaced from and duplicating the undulations provided in the pattern groove, as shown in FIG. 9. Preferably the teeth 61 are positioned along that edge of the pattern groove which is nearest to the saw in operation. Cooperating with the teeth 61 is a sprocket gear 62 carried at the lower end of a vertically disposed shaft 63 mounted for rotation in the forward part of carriage plate 126 in a position to mesh with and drivingly engage the sprocket teeth 61 (see FIG. 10). It should be noted that due to the position of the sprocket teeth 61 and the sprocket gear 62 between the carriage 127 and the top of the pattern piece 60, it is preferable to raise the level of the upper surface of the groove reinforcing means 137, on the outer wall of the pattern groove, with respect to the reinforcing material on the inner face of such groove, as shown, in order to provide clearance for the sprocket gear and teeth (see FIG. 10). The upper end of the shaft 63 carries a sprocket gear 64 driven by sprocket chain 65 which is operatively engaged with and driven by motor 66 mounted on an upright standard 108 of the saw frame as shown in FIG. 8. The motor 66 drives the sprocket chain 65 through a double-ended reduction gear box 68 to which vertical shaft members 69 and 70 are drivingly connected. Shaft 69 at its lower end carries a driving sprocket 71 with which chain 65 is engaged while the shaft 70 extends upwardly from the gear box 68 and through a sprocket gear 72 carried by said shaft, and sprocket chain 73 engaged with said gear, drives sprocket gear 74 mounted for rotation on a plate 75 at the upper end of the saw frame. The shaft 76 of sprocket gear 74 extends upwardly and carries a driving gear 77 positioned to engage the teeth 61a of the upper pattern piece 59. The ends of the shafts 69 and 70 remote from the gear box 68 may be journalled in bearing sleeve members carried by the upper and lower parts of the saw frame structure as shown. By thus mounting the drive means for the saw frame on the saw frame and providing the pattern pieces 59 and 60 with pins or sprocket teeth as shown, the saw frame may be translated within the framework 1 and cause the saw carried by the saw frame to be presented to a workpiece in a manner to duplicate in the work the undulations of the pattern pieces as previously described.

It is desirable to provide a control mechanism for the motor 55 of FIG. 1 or the motor 66 of FIG. 8, in order properly to deenergize and reverse the direction of rotation of these motors at the completion of an excursion of the saw frame within the framework 1. To this end I provide a control mechanism comprising a switch member S and an actuator therefor (shown generally at SA) positioned on the frame 1 to be actuated by a part of the saw frame as the same nears one end or the other of a transverse excursion within the framework 1.

By way of example the switch actuator SA as shown in FIGS. 13, 14 and 15 comprises a pair of extended slidably mounted rods or bars 78, 79 which may be disposed on the forward upper edge 80 of the upper panel member 2, see FIGS. 1 and 12, although the switch actuator SA may be mounted at any place on the frame 1 where it may be contacted for actuation by a part of the saw frame as the latter moves transversely back and forth within the frame. Conveniently, the bars 78, 79 may be slotted at points 78a and 79a and mounting screws 80a pass through the slots into the frame 1 as shown in FIG. 15 in a manner to position the bars 78 and 79 in superposed relation as shown, for limited longitudinal sliding movement as permitted by the screws 80a operating within the slots 78a and 79a respectively.

The bars so mounted as shown in FIG. 13 cooperate with a pivoted lever 81 to oscillate said lever in a manner to move a control switch S from closed to open position in the following manner; the upper bar 78 at one end 82 thereof extends beyond the adjacent end 83 of the lower bar 79, and said end 81 is provided with a depending lug 84 as shown (see FIG. 13). The upper end 81a of the lever 81 is disposed within the space between the end lug 84 of the bar 78 and the adjacent end 83 of the bar 79. The bars 78 and 79 are designed to be shifted longitudinally when contacted by the moving saw frame to cause the bars alternately to engage the end 81a and the lever 81 to actuate the switch S. To this end the underface of the upper panel 2 of the frame 1 is provided with a pair of spaced pivotally mounted levers 85 and 86. These levers are pivoted intermediate their ends on vertically disposed pivot members as shown at 87 and 88 respectively, and the respective inner ends 85a and 86a of the levers are disposed in the path of movement of an upstanding lug 89 carried by the upper frame portion of the saw frame. Thus, as the saw frame traverses its path of movement within the frame 1, said lug 89 will alternately engage the end 85a and 86a respectively of the levers 85 and 86. The bar 79 carries a depending pin 87 disposed adjacent to the lever 85 to be engaged thereby when said lever is rocked on its pivot by engagement with the lug 89 carried by the saw frame. Similarly, the bar 78 carries a horizontally projecting pin 90 extending forwardly from the bar and disposed to be engaged by an upstanding pin 91 carried by the forward end of the lever 86. The operation of the switch actuator SA is as follows; assuming the switch S, which is a conventional double-throw, three-pole switch connected to control the direction of rotation of the motor 55 (or 66) is in a position to cause the motor to turn in a direction to cause the saw frame to move from right to left as viewed in FIG. 13, the lug 89 on the saw frame, at a point near the end of its excursion in that direction, will engage the lever 85 causing it to pivot and move the front end thereof into engagement with the pin 87 on the bar 79. This will move the bar to the right as viewed in FIGS. 13 and 14 and bring the end 83 of the bar into engagement with the lever 81 and rock it in a clockwise direction to cause the arm S' engaged beneath a blade or bar of the switch S, to open the switch and stop the motor and saw frame. When the saw frame is to move from left to right, the switch S is manually moved in a clockwise direction to bring the end 81a of the lever 81 in close proximity to the lug 84 of the bar 78. The switch S is then manually moved to close the contacts thereof which will cause the motor 55 to turn in the opposite direction to carry the saw frame from right to left to bring the saw frame back to its original position. When the lug 89 carried by the saw frame during this excursion thereof engages the lever 86, the pin 91 carried thereby engages the pin 90 on the bar 78 and shifts said bar to the left as viewed in FIGS. 13 and 14 to thus cause the lug 84 to shift the lever 81 in the opposite or counterclockwise direction to open the switch S and stop the motor and the saw frame, as previously described.

A further modification of the invention is shown in FIG. 16 wherein a simplified manner of guiding and swinging the saw unit as it is translated within the main frame of the machine to present the saw blade to the work in accordance with predetermined contours in a pattern piece is shown. Thus in FIG. 16, the upper and lower portions of the saw frame 5 are indicated generally at 200 and 201 respectively, and these portions of the saw frame are constructed and arranged in a manner previously described in respect to FIGS. 1 and 12, and the saw unit may be translated within the main frame 1 of the machine by upper and lower driven sprocket chains 250 and 249 as previously described with respect to the first modification. The chains 249 and 250 are connected to the saw frame by pins 247 and 248 as previously described. In lieu of the grooved pattern pieces and guide rollers of the first described modification, I propose to employ a pattern piece in the form of a track of generally circular cross section as shown at 236 and secured to the lower panel 203 in any suitable manner such as by pins 204. The track member 236 is bent or contoured to provide the pattern delineations which are to be formed or cut by the saw. A similar pattern member 245 is secured to the underface of the upper panel member 202 of the main frame, and this pattern member is provided with a pattern contour which is a mirror image of that of the pattern track 236.

The upper and lower saw frame portions 200 and 201 are each provided with a horizontally disposed shaft 260 and 261, respectively, and these shafts are each provided with a grooved roller 262 and 263 respectively. The axes 260 and 261 are vertically aligned and preferably the grooves in the rollers 262 and 263 are V-shaped in cross section as shown, and the apex of the V in each instance is in vertical alignment with the plane of movement of the saw blade 218. Furthermore, the forward cutting edge of the saw 218 is disposed in substantially vertical alignment with the axes of the rollers 260 and 261. This is clearly shown in FIGS. 16 and 17. With this arrangement, as the saw unit is translated within the main frame of the machine the grooved rollers 262 and 263 cooperate with the rounded surface of the track pattern members 245 and 236, respectively, to cause the saw frame to swing about an axis generally coincident with the cutting edge of the saw blade in accordance with the undulations in the pattern tracks. A full description of the manner in which the V-shaped rollers and the circular cross section pattern tracks operate to control relative movement between a saw and a work piece will be found in my copending application S.N. 183,829, filed March 20, 1962.

A further modification of the invention is shown in FIGS. 18 and 19. In this form of the invention the upper and lower portions of the saw frame are shown at 300 and 301 respectively, and are constructed and arranged as described in respect to the saw frame unit of FIGS. 1 and 12. The frame parts 300 and 301 each carry a horizontally disposed shaft 360 and 361, similar to the arrangement of the shafts 260 and 261 in FIG. 16. The shafts 360 and 361 carry grooved rollers 362 and 363 and these rollers are preferably V-shaped in cross section with the apices of said grooves vertically aligned and coplanar in respect to each other and the plane of the saw 318. Each of the rollers 362 and 363 at the apex of the respective V-shaped grooves thereof is provided with a spur gear 364 and 365, respectively. To assemble the gears as shown, the rollers 362 and 363 may be formed in two parts as shown in FIG. 20, and the respective gears inserted between the parts of each roller, and the roller parts and gears secured together by screws or bolts 375.

The gears 364 and 365 are disposed centrally of each roller as shown, and are in coplanar vertical alignment. Each of the rollers 362 and 363 and associated gears 364 and 365, are secured to their respective shafts 360 and 361 and the said shafts are driven by sprocket chains 366 and 367 engaged with sprocket gears 368 and 369 carried by the respective shafts as shown. The sprocket chains 366 and 367 are driven from a suitable electric motor M2 conveniently mounted on the lower frame member 301. Pattern track members 345 and 346 are respectively mounted on the upper and lower panel members 302 and 303 as described in respect to the modification shown in FIGS. 16 and 17, but in this instance said track members are provided on the exposed rounded exterior surfaces thereof with gear teeth forming racks 368 and 369 on the respective tracks with which the spur gears 364 and 365 are engaged. The shafts 360 and 361 are disposed with their axes vertically aligned and substantially coplanar with the cutting edge of the saw blade, similar to the arrangement shown in FIG. 17. Thus, as the gears 364 and 365 are driven upon energization of the motor M2, the engagement of the respective gears with the teeth carried by the respective track pattern members will cause the saw frame to be translated within the main frame of the machine while the V-shaped, grooved rollers will cooperate with the curved portions of the pattern tracks to swing the saw frame about the cutting edge of the saw as an axis, as described in respect to the modification shown in FIGS. 15 and 17.

It will be understood that in respect to the modifications shown in FIGS. 16 and 17, and 18 and 19 and 20, that the pattern track members are secured to the inner faces of the respective panels 1 and 2 of the main frame of the machine, and that these pattern track members will be replaceable to provide pattern pieces of different contours and that in each instance, the removable pattern pieces will cooperate with stationary pattern terminal track portions 340, similar to the straight terminal pattern groove portions described in respect to the modification shown in FIGS. 1 and 12, and shown at 40a in FIG. 9.

It will be understood that the motor M of FIGS. 1 and 12, the motor M1 in FIG. 8, are provided with means for connecting them to a suitable source of electrical potential, not shown, and preferably, these connections may be made with a conventional on, off switch, not shown.

The motor 55 of FIGS. 1 and 12, is in use connected to a suitable source of electric potential, not shown, through the conventional three-pole, double-throw reversing switch S, shown in FIG. 13, by conventional reversing circuitry, and the levers 85 and 86 are disposed in relation to the path of movement of the saw so that the switch S is automatically opened, as described, at a point where the saw unit is in one or the other of the "parking" areas 40 of the main frame.

The apparatus as described provides means whereby a work piece clamped to the worktable 19 with the edge of the work piece extended inwardly beyond the inner edge of the table, may be formed with an irregular edge conforming to contours delineated in pattern pieces secured to the respective inner faces of the upper and lower panel members of the main frame when the saw frame driven by an electric motor traverses the pattern pieces to cause the saw frame to swing about a vertical axis and thus present the cutting edge of the saw carried by the frame, to the work piece at varying angles determined by the contours present in the pattern pieces. Futhermore, the automatic stop means provided will enable the saw to be manually started and automatically stopped at the end of a complete traverse of the saw frame within the main frame of the machine, with the saw frame unit "parked" beyond one end or the other of said pattern pieces, and within the terminal portions of the track or groove 40–40a.

While I have described mounting a work piece on the worktable 19 in cantilever fashion so that the edge of the work piece to be sawed will project inwardly beyond the innermost edge of the worktable, it should be noted that in instances where the work piece is of relatively thin material such as for instance thin plywood, it is desirable to support the work piece on both sides of the line of cut. I may accomplish this by providing an auxiliary work supporting strip such as shown at 19a in FIGS. 2 and 12, removably supported on the end pieces 20, in spaced relation to the inner edge of the table 19. The strip 19a may be removably attached to the strips 20 in any desired manner, such as by screws as shown. Thus, the inner edge of the work piece is supported to thereby preclude undue vibration during sawing, having in mind the downward thrust of the saw blade on the work, while leaving a space between the strip 19a and the adjacent edge of the worktable 19 within which the saw blade may travel.

Several modified forms of means for driving the saw frame within the main frame of the machine are described, and these are all applicable to and operable with to provide a traveling band saw having automatic stop control associated therewith. Furthermore, it will be apparent that while I have described dimension in respect to a "band saw machine," the principles embodied in my machine are applicable to traveling saws of the saber or jig type. Having thus described my invention it will be understood by those familiar with the art that various changes may be made in respect to arrangements in size and proportion of parts without departing from the spirit of my invention which is set forth more clearly in the claims appended hereto.

What I claim is:

1. The traveling band saw comprising a main framework, a band saw unit including a band saw, mounting means therefor, and power means to drive the saw; a means for mounting the band saw unit upon the main frame for translational movement with respect thereto, power means for translating the band saw unit within the main frame, the mounting means for the band saw unit including means for pivotally supporting the band saw unit for pivotal movement about a vertical axis generally coincident with the cutting edge of the saw, a supporting roller provided on the band saw unit for rotation about an axis perpendicular to the pivotal axis of the saw unit and in engagement with an underlying portion of the framework to relieve the strain of the band saw unit on said pivoted mounting means when the band saw is in operation.

2. A traveling band saw comprising a framework, a band saw unit including a band saw, mounting means therefor, and power means to drive the saw, means for pivotally supporting the band saw unit within the framework for pivotal movement about an axis generally coincident with the path of movement of the cutting edge of the saw, means mounting the band saw unit within the framework for translational movement with respect thereto, and pattern means cooperatively carried by the framework and the band saw unit for swinging the band saw about said pivotal axis during translational movement of the band saw unit within the framework, means for translating the saw unit within the framework, said pattern means including a pattern member having a contoured guide track, a fixed guide member caried by the band saw unit and engaged with said guide track, said fixed guide means being disposed on a vertical axis substantially coincident with the path of movement of the cutting edge of the saw and a pair of movable guide means carried by the band saw unit and engaged with said pattern track, one such guide means leading the fixed guide means and another such guide means trailing the fixed guide means, means mounting said movable guide means on the band saw unit for movement toward and away from the path of movement of the saw blade and functioning in cooperation with said contoured pattern track to swing the band saw unit about said vertical axis of the fixed guide member for presenting the cutting edge of the saw blade to a work piece at the proper angle of cut to produce a kerf in the work piece corresponding to the contours of said pattern.

3. The traveling band saw described in claim 2 wherein said guide track is in the form of a contoured groove, and wherein said fixed and movable guide means are in the form of parallel pins engaged within said groove.

4. The traveling band saw described in claim 3 wherein a series of sprocket teeth are carried by the pattern member and arranged along a root line corresponding to the contours of the guide groove, a sprocket wheel carried by the band saw unit and engaged with said sprocket teeth, and means for driving said sprocket to cause translation of the band saw unit within said framework.

5. The traveling band saw described in claim 3 wherein said movable guide pins are mounted on a carriage having sliding movement on the band saw unit towards and away from the plane of movement of the band saw whereby to cause the band saw unit to swing about the axis of said fixed guide pin to change the angle of cut of the saw with respect to the work.

6. A sawing machine comprising a main frame, elongated pattern track means mounted thereon, a saw unit comprising a saw frame, a band saw mounted on the saw frame, and means for driving said saw, means for mounting said saw unit within said main frame for translatory movement therein in the general direction of elongation of the pattern means and for pivotal movement about an axis generally coincident with the cutting edge of the saw, said mounting means including pattern track engaging means carried by the saw unit, and means for driving the saw unit along said pattern track means, said least-mentioned means comprising motor means on said main frame for rotation about an axis, a sprocket driven thereby, a sprocket chain looped about spaced sprocket gears mounted on said main frame for rotation about axes parallel to the axis of the motor, the opposite ends of said sprocket chain being attached to said saw unit near one end thereof, said sprocket gears being mounted on elongated shafts extending substantially from end to end of the main frame, a second pair of sprocket gears mounted on said elongated shafts, a second sprocket chain looped about said second pair of sprocket gears, the ends of said second chain being connected to the saw unit at the opposite end thereof.

7. A sawing machine comprising a main frame, elongated pattern track means mounted thereon, a saw unit comprising a saw frame, a band saw mounted on the saw frame, and means for driving said saw, means for mounting said saw unit within said main frame for translatory movement therein in the general direction of elongation of the pattern means and for pivotal movement about an axis generally coincident with the cutting edge of the saw, said mounting means including pattern track engaging means carried by the saw unit, and means for driving the saw unit along said pattern track means, said last-mentioned means comprising motor means on said main frame for rotation about an axis, a sprocket driven thereby, a sprocket chain looped about spaced sprocket gears mounted on said main frame for rotation about axes parallel to the axis of the motor, the opposite ends of said sprocket chain being attached to said saw unit near one end thereof, an elongated toothed member carried by the main frame and engaged by said gear, and means on said saw unit for driving said gear member.

8. The sawing machine described in claim 7 wherein the pattern means includes an elongated contoured track member of generally circular cross section provided with longitudinally spaced undulations defining pattern delineations, and wherein said saw unit is provided with a peripherally grooved roller mounted for rotation about an axis perpendicular to the plane of movement of the saw and generally aligned with the cutting edge thereof.

9. A sawing machine comprising a main frame, elongated pattern track means mounted thereon, a saw unit comprising a saw frame, a band saw mounted on the saw frame, and means for driving said saw, means for mounting said saw unit within said main frame for translatory movement therein in the general direction of elongation of the pattern means and for pivotal movement about an axis generally coincident with the cutting edge of the saw, said mounting means including pattern track engaging means carried by the saw unit, said pattern means including an elongated track member generally circular in cross section and having contoured pattern delineations spaced longitudinally thereof, the exposed portion of the track being provided with a toothed rack formation, and wherein the saw unit is provided with a toothed roller riding on said track with the teeth of the roller engaged in said rack, and means for driving the roller along the track.

10. The sawing machine described in claim 9 wherein said roller is provided with a V-shaped peripheral groove defined by lateral flanges, said flanges engaging said track on opposite sides of said rack formation, said roller being mounted for rotation on an axis generally perpendicular to the plane of the saw and aligned with the cutting edge thereof and with the pivotal axis of the saw unit.

11. In a traveling band saw, a main frame member including upper and lower generally horizontal supporting members connected by spaced uprights, a saw unit including a saw supporting frame, band saw pulley members supported by said frame in vertically spaced relation, a band saw trained about said pulley motor means for driving one of said pulley means at the opposite ends of said saw supporting frame for supporting said saw frame for pivotal and translatory movement within the main frame in position to dispose the cutting edge of the saw in a generally vertical plane, said supporting means for the saw unit including tracking members adapted to traverse opposed pattern means mounted within said main frame on said upper and lower supporting members respectively, tracking members including rollers having peripheral V-shaped grooves and mounted at opposite ends of the saw frame, respectively, and positioned to engage the pattern tracks carried by the main frame.

12. A traveling band saw comprising a main framework, a band saw unit including a band saw, mounting means therefor, and power means to drive the saw; means for mounting the saw unit within the framework for translational movement with respect thereto, power means for translating the band saw unit within the framework, said mounting means for the band saw unit including means for pivotally supporting the band saw unit within said framework for pivotal movement about an axis substantially coincident with the cutting edge of the saw, and cooperating pattern means carried by the framework and saw unit to guide the saw unit along a given path of movement, pattern tracing means carried by the saw unit and traversing said pattern means during translatory movement of the saw unit, said means for mounting the saw unit within the framework including means engaging said pattern means to swing the saw unit about said pivotal axis during translatory movement thereof.

13. The traveling saw described in claim 12 wherein said pattern tracer means includes means defining the pivotal axis of the saw unit and means for developing within said pattern means a turning couple effective to swing the saw unit about said axis in response to pattern contours.

14. The traveling saw described in claim 13 wherein said last-mentioned means comprises means carried by the saw unit for engaging the pattern means at spaced points disposed on opposite sides of said pivotal axis.

15. The traveling saw described in claim 13 wherein a work supporting surface is provided within the framework and disposed in a plane substantially perpendicular to the cutting edge of the saw.

References Cited by the Examiner
UNITED STATES PATENTS

| | | | |
|---|---|---|---|
| 961,453 | 6/1910 | Krawchenko | 143—17.1 |
| 2,691,206 | 10/1954 | Kautz | 83—201.07 |
| 2,934,107 | 4/1960 | Hawkins | 143—171 |
| 3,010,352 | 11/1961 | Dunlap | 83—565 X |
| 3,014,510 | 12/1961 | Hawkins | 143—26.2 |
| 3,068,913 | 12/1962 | Hawkins | 143—26.2 |
| 3,196,910 | 7/1965 | Hawkins | 143—26.2 |

DONALD R. SCHRAN, *Primary Examiner.*